(12) United States Patent
Ignatuk et al.

(10) Patent No.: US 10,257,237 B2
(45) Date of Patent: Apr. 9, 2019

(54) RECOVERING FROM AND AVOIDING NETWORK CONNECTIVITY LOSS

(71) Applicant: NETAPP, INC., Sunnyvale, CA (US)

(72) Inventors: James Andrew Ignatuk, Mars, PA (US); Andrew Ryan Dalton, Apex, NC (US); Jeffrey Eric Semke, Allison Park, PA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/386,580

(22) Filed: Dec. 21, 2016

(65) Prior Publication Data

US 2018/0176110 A1 Jun. 21, 2018

(51) Int. Cl.
| | | |
|---|---|---|
| *G06F 15/173* | (2006.01) | |
| *H04L 29/06* | (2006.01) | |
| *H04L 29/08* | (2006.01) | |
| *H04L 12/26* | (2006.01) | |

(52) U.S. Cl.
CPC ...... *H04L 65/1033* (2013.01); *H04L 43/0811* (2013.01); *H04L 43/10* (2013.01); *H04L 67/1097* (2013.01)

(58) Field of Classification Search
USPC ................. 709/223, 224, 227, 229
See application file for complete search history.

(56) References Cited

U.S. PATENT DOCUMENTS

| | | | | |
|---|---|---|---|---|
| 2004/0111520 | A1* | 6/2004 | Krantz | H04L 63/08 709/229 |
| 2005/0268043 | A1* | 12/2005 | Kitamura | G06F 11/142 711/131 |
| 2011/0019535 | A1* | 1/2011 | Nakashima | H04L 41/12 370/218 |
| 2014/0153407 | A1* | 6/2014 | Xu | H04W 48/08 370/248 |
| 2017/0171057 | A1* | 6/2017 | Dong | H04L 45/02 |

\* cited by examiner

*Primary Examiner* — Liang Che A Wang
(74) *Attorney, Agent, or Firm* — Klein, O'Neill & Singh, LLP

(57) ABSTRACT

Systems and methods are disclosed for monitoring and recovering from internal and external network connectivity losses. The systems and applications implement algorithms that mark sets of network ports as healthy or degraded, and this way the filer can recover from and compensate for sets that are not reachable, based on the diagnostics performed on the internal and external reachability of the set and/or individual network ports as disclosed herein.

17 Claims, 6 Drawing Sheets

RECOVERING FROM AND AVOIDING NETWORK CONNECTIVITY LOSS

FIELD

The disclosure relates to network connectivity of data storage systems.

BACKGROUND

The following description includes information that may be useful in understanding the present disclosure. It is not an admission that any of the information provided herein is prior art or relevant to the present disclosure, or that any publication specifically or implicitly referenced is prior art.

File Server or Filer

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Storage Operating System

As used herein, the term "storage operating system" generally refers to the computer-executable code operable on a computer that manages data access and may, in the case of a filer, implement file system semantics. The storage operating system can also be implemented as an application program operating over a general-purpose operating system, such as UNIX® or Windows NT®, or as a general-purpose operating system with configurable functionality, which is configured for storage applications as described herein.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n–1 blocks.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

Physical Disk Storage

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

Storage Clusters and System Architecture

In some cases, the storage system may be implemented as a cluster of storage nodes that includes a filer and attached storage, for each node of the cluster. In some cases, the storage system will be implemented as pairs of redundant storage nodes, with connectivity and access to the physical storage by both filers of the node pair.

Network ports (i.e., hardware ports) on each node may provide the physical connectivity required to serve data to clients and hosts. In the case of NAS clients, network ports are usually physical links to an Ethernet switch, or other network switch. This provides a link to each other at the data link layer (layer 2). All of the ports in a cluster may be connected to form a VLAN or broadcast domain (isolated computer network in the data link layer (Layer 2).

Accordingly, clusters of nodes may form a private or other broadcast domain LAN. The traffic between the nodes (and ports of the nodes) may be managed by a management network.

Each node of the cluster is also connected to one or more routers that provide layer three connectivity to clients. The clients may access the storage on the cluster by accessing storage virtual machines that may be addressed to the IP address (or other network layer-3 addresses) of one of the nodes (e.g. network ports) on the cluster. Because they are virtual machines, the IP address may be changed if the hardware in a node fails and the cluster has a redundant architecture.

Accordingly, the nodes may ping each other and communicate packets, and may also communicate with external clients (for example to send storage related packets back and forth). If one of the ports on the nodes fails, or cannot communicate with external clients or other ports on the same network, the storage system may not function properly.

BRIEF DESCRIPTION OF THE DRAWINGS

The accompanying drawings, which are incorporated in and constitute a part of this specification, exemplify the embodiments of the present disclosure and, together with the description, serve to explain and illustrate principles of the disclosure. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
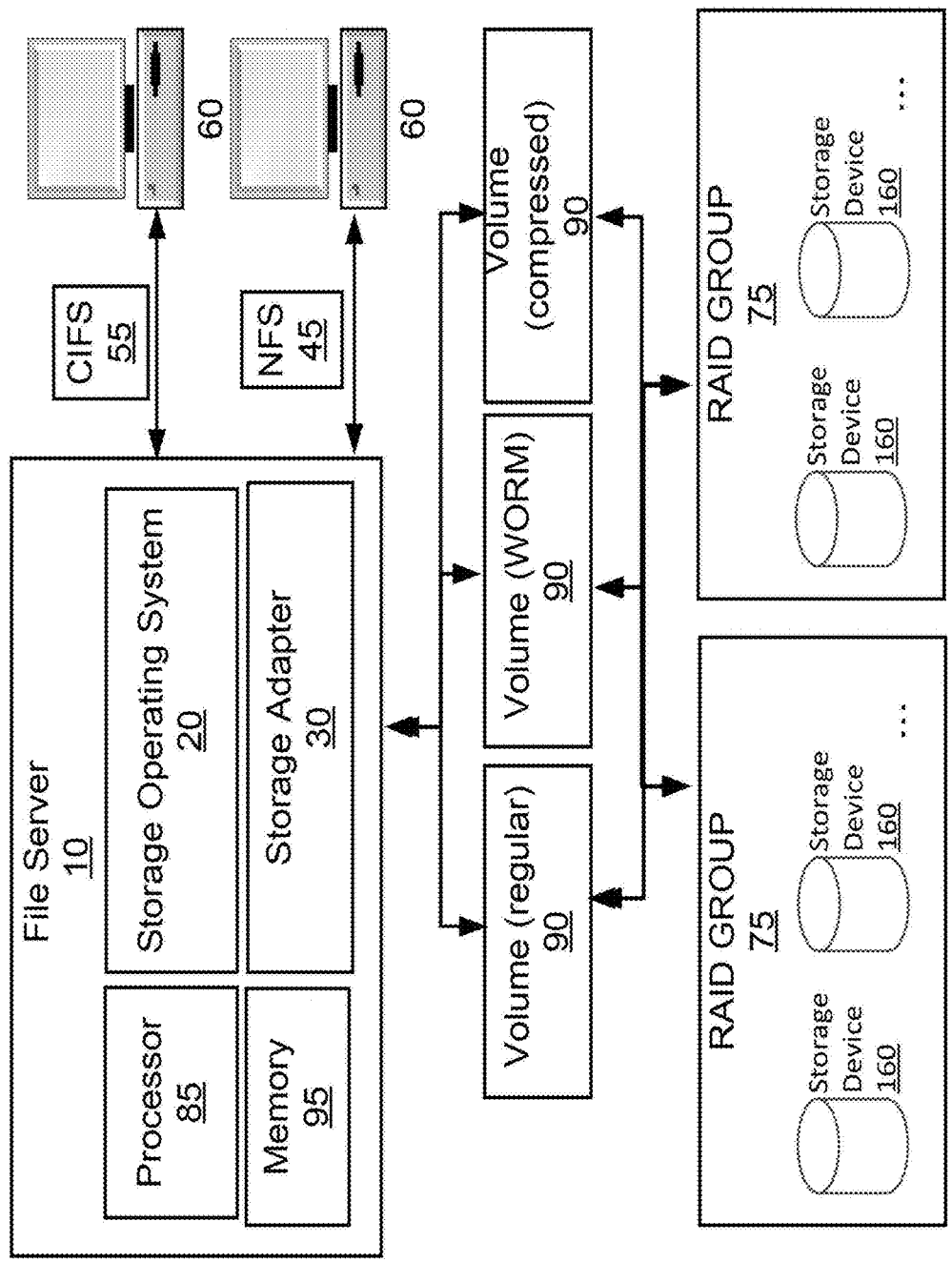
FIG. 1 depicts, in accordance with various embodiments of the present disclosure, a diagram representing a storage system.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Unless defined otherwise, technical and scientific terms used herein have the same meaning as commonly understood by one of ordinary skill in the art to which this disclosure belongs. One skilled in the art will recognize many methods and materials similar or equivalent to those described herein, which could be used in the practice of the present disclosure. Indeed, the present disclosure is in no way limited to the methods and materials specifically described.

Various examples of the disclosure will now be described. The following description provides specific details for a thorough understanding and enabling description of these examples. One skilled in the relevant art will understand, however, that the disclosure may be practiced without many of these details. Likewise, one skilled in the relevant art will also understand that the disclosure can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the disclosure. Indeed, certain terms may even be emphasized below; however, any terminology intended to be interpreted in any restricted manner will be overtly and specifically defined as such in this Detailed Description section.

Overview

Storage systems consist of nodes that include filers connected to physical storage that are connected to a local area network through network devices called ports. Ports are hardware adaptors (e.g. Ethernet adaptors) capable of serving an IP address. As used herein, IP address refers to any layer-3 network address. For instance "IP address" may refer to: addresses based on the following protocols: IPv4, IPv6, IPX, XNS's IDP, or other address formats used in layer-3 networking protocols developed in the future. Each filer may have one or more ports for communicating within the layer-2 broadcast domain to other ports in the cluster on other nodes, or for communicating externally with clients through a layer-3 router. Accordingly, if a port on the filer can communicate with other ports and their associated filers within the broadcast domain, the port is said to have internal reachability, and the set of ports it communicates with forms an internal reachability set. Additionally, if the port can communicate with clients or other ports over a router, it is said to have external reachability.

Systems and methods are disclosed for monitoring and recovering from internal and external network connectivity losses. The systems and applications implement algorithms that mark sets of network ports as healthy or degraded, and this way the filer can recover from and compensate for sets that are not reachable, based on the diagnostics performed on the internal and external reachability of the set and/or individual network ports as disclosed herein.

For instance, an algorithm is disclosed for preventing connectivity disruptions between ports and clients in a mass storage cluster by dynamically determining a port's health in terms of the port's connectivity and reachability between it and other devices, clients, and gateways. In some examples, a port serving an IP address with active client connections is considered "healthy," a network device serving an IP address with sufficient Layer-3 reachability to an applicable gateway is considered "healthy," and a port with sufficient Layer-2 reachability to other ports within the port's broadcast domain is considered healthy; however, a port that meets none of these criteria can be considered "degraded" if there also exists a "healthy" port on the same filer in the same Layer-2 broadcast domain. By periodically examining the health of the ports on each filer in the mass storage cluster, the system can proactively detect and prevent connectivity disruptions between the mass storage cluster and the clients it serves.

Example Storage System

FIG. 1 illustrates an overview of an example of a storage system according to the present disclosure. The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In some embodiments, the storage system includes a file server 10 that administers a storage system. The file server 10 generally includes a storage adapter 30 and a storage operating system 20. The storage operating system 20 may be any suitable storage system to access and store data on a RAID or similar storage configuration.

The storage adaptor 30 is interfaced with one or more RAID groups 75 or other mass storage hardware components. The RAID groups include storage devices 160. Examples of storage devices 160 include hard disk drives, non-volatile memories (e.g., flash memories), and tape drives. The storage adaptor 30 accesses data requested by clients 60 based at least partially on instructions from the operating system 20.

Each client 60 may interact with the file server 10 in accordance with a client/server model of information delivery. That is, clients 60 may request the services of the file server 10, and the file server 10 may return the results of the services requested by clients 60 by exchanging packets encapsulating, for example, Transmission Control Protocol (TCP)/Internet Protocol (IP) or another network protocol (e.g., Common Internet File System (CIFS) 55 and Network Files System (NFS) 45 format.

The storage operating system 20 implements a file system to logically organize data as a hierarchical structure of directories and files. The files (e.g. volumes 90) or other data batches may, in some embodiments, be grouped together and either grouped in the same location or distributed in different physical locations on the physical storage devices 160. In some embodiments, the volumes 90 will be regular volumes, dedicated WORM volumes 90, or compressed volumes 90.

Figure 2:
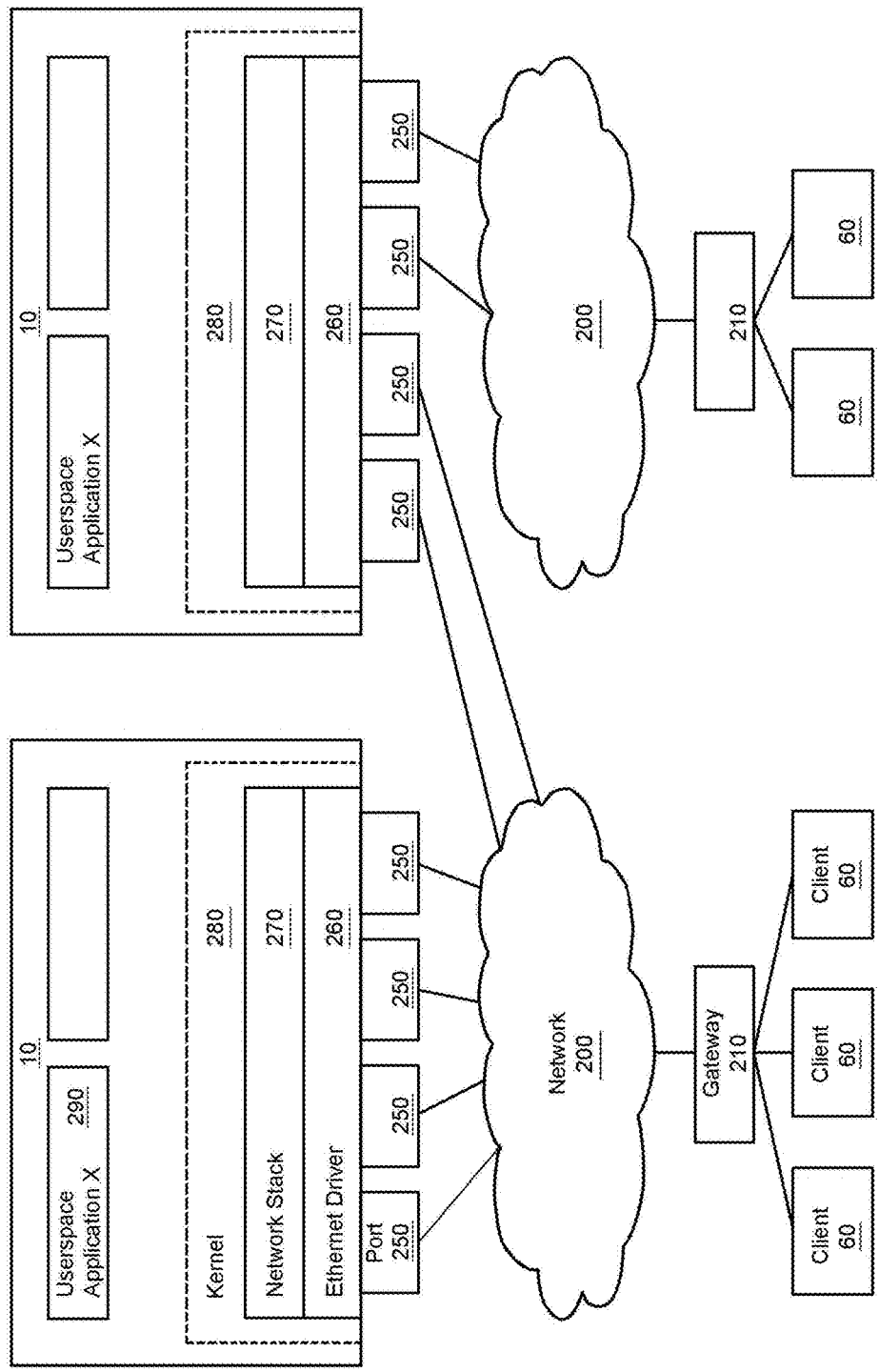
FIG. 2 depicts, in accordance with various embodiments of the present disclosure, a diagram of an overview of a storage cluster and its connectivity to clients.

FIG. 2 illustrates an example of a storage cluster with two filers 10 connected to networks 200 through hardware ports 250 that are connected to each other over the network 200. Additionally, the hardware ports 250 are connected to clients 60 through gateway 210 over networks 200. The filers 10 may run various applications including distributed user space applications 290. The application(s) 290 may send data via a network stack 270 in the kernel 280, for instance ping request from various ports 250. The filer 10 may use an Ethernet driver 260 to transmit data via ports 250 across a network 200 and receive data (e.g. a return ping).

In some examples, the software implementing the disclosed software processes may include user space applications 290 that transmit data over ports 250 and that discover their ability to communicate data with other ports 250, clients 60, and gateways 210. The disclosed systems and methods may mark certain sets of ports 250 as healthy or degraded based on the criteria disclosed herein. Accordingly, the filer 10 can recover from and avoid network connectivity loss to client 60 by monitoring the health of its ports 250, and taking corrective action (e.g. failover, or preventing certain devices from hosting IP addresses) or notifying an administrator so the problem can be addressed at the hardware level.

Internal Reachability

Figure 3:
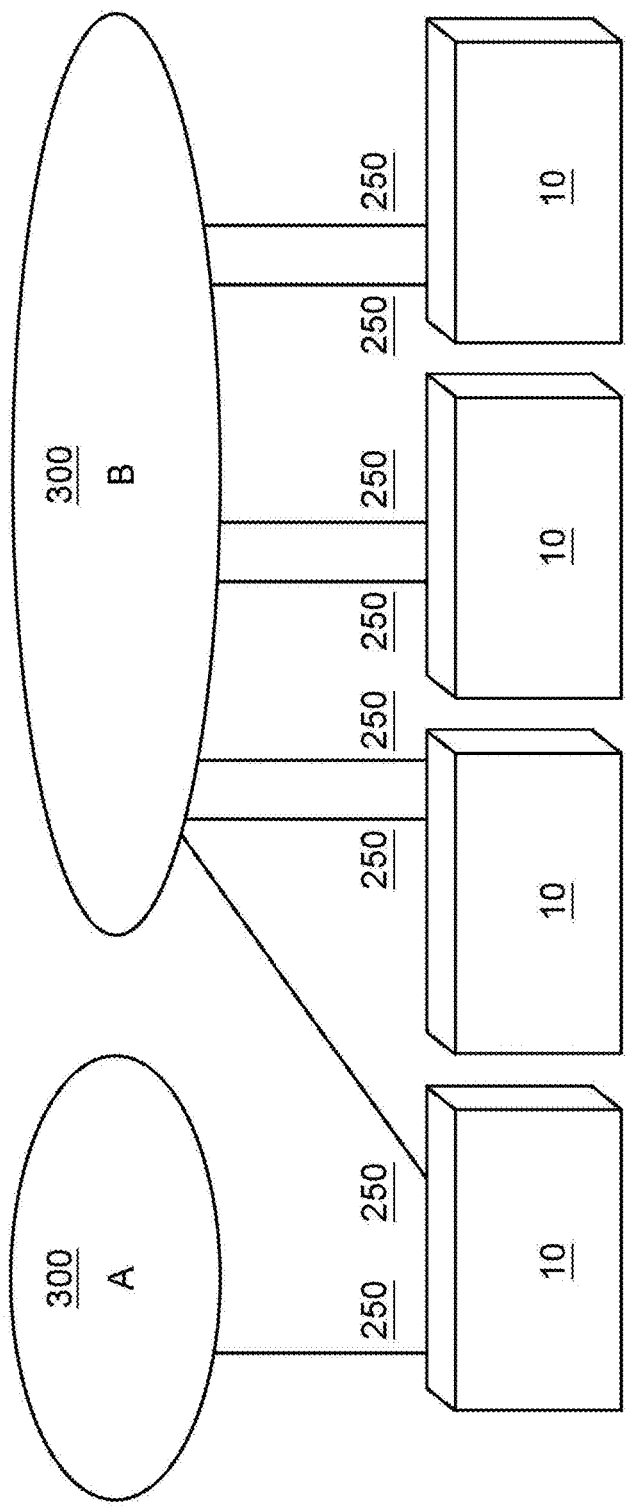
FIG. 3 depicts, in accordance with various embodiments of the present disclosure, a diagram of an example of various ports of storage filers and their connectivity.

Accordingly, in some examples, systems and methods include a reachability health monitor (e.g. that resides within an application 290) for identifying and maintaining a list or data file of ports 250 in the filer 10 and whether they are healthy or degraded based on whether they have sufficient internal reachability. FIG. 3 illustrates an example of a storage system that includes filers 10, ports 250 where all of the ports 250 are connected to the same layer-2 broad cast domain (layer-2 and layer-3 references refer to the OSI networking model) with internal reachability sets 300 A and B. For instance, an internal reachability set 300 may be defined as a set of ports 250 that can layer-2 ping each other or otherwise communicate data within each broadcast domain (e.g. layer-2 LAN). In some examples, internal a given port 250 is internally reachable if it can layer-2 ping a different port 250 on another filer 10 that is in the same layer-2 broadcast domain.

If all ports 250 in a broadcast domain are healthy, they should be able to all layer-2 ping each other, and therefore there should be one internal reachability set 300 per broadcast domain. However, if ports 250 assigned to a broadcast domain do not all belong to the same internal reachability set 300, there is a potential network configuration problem that can lead to IP addresses being black-holed or failed over to a port 250 that does not have network connectivity to the client 60, causing a customer outage. In the example in FIG. 3, the single port 250 in set 300 A cannot reach any of the ports in set 300 B, but all of the ports 250 in set 300 B can layer-2 ping each other and therefore have internal reachability.

In some examples, a health monitor may only determine whether a set of ports 250 has internal reachability as a proxy for whether they are healthy. However, as disclosed herein, evaluating for internal reachability 300 only results in client outages and other issues because it does not take into account external reachability.

External Reachability

Accordingly, in some examples a health monitor may identify ports 250 also that have external reachability. A port 250 may be considered to have external reachability if the port 250 is able to layer-2 ping another port 250 that is hosting an IP address with active data traffic. Additionally, a port 250 may be considered to have external reachability if it can layer-3 ping a gateway configured for an IP Address hosted on another port that has layer-2 ping reachability to the target port. In some examples, a set 300 of internally reachable ports 250 may be considered to have external reachability if one of the ports 250 in the set has external reachability. In other examples, a port 250 may only be considered to have external reachability if it has external reachability to a gateway or is hosting active data traffic.

Figure 4:
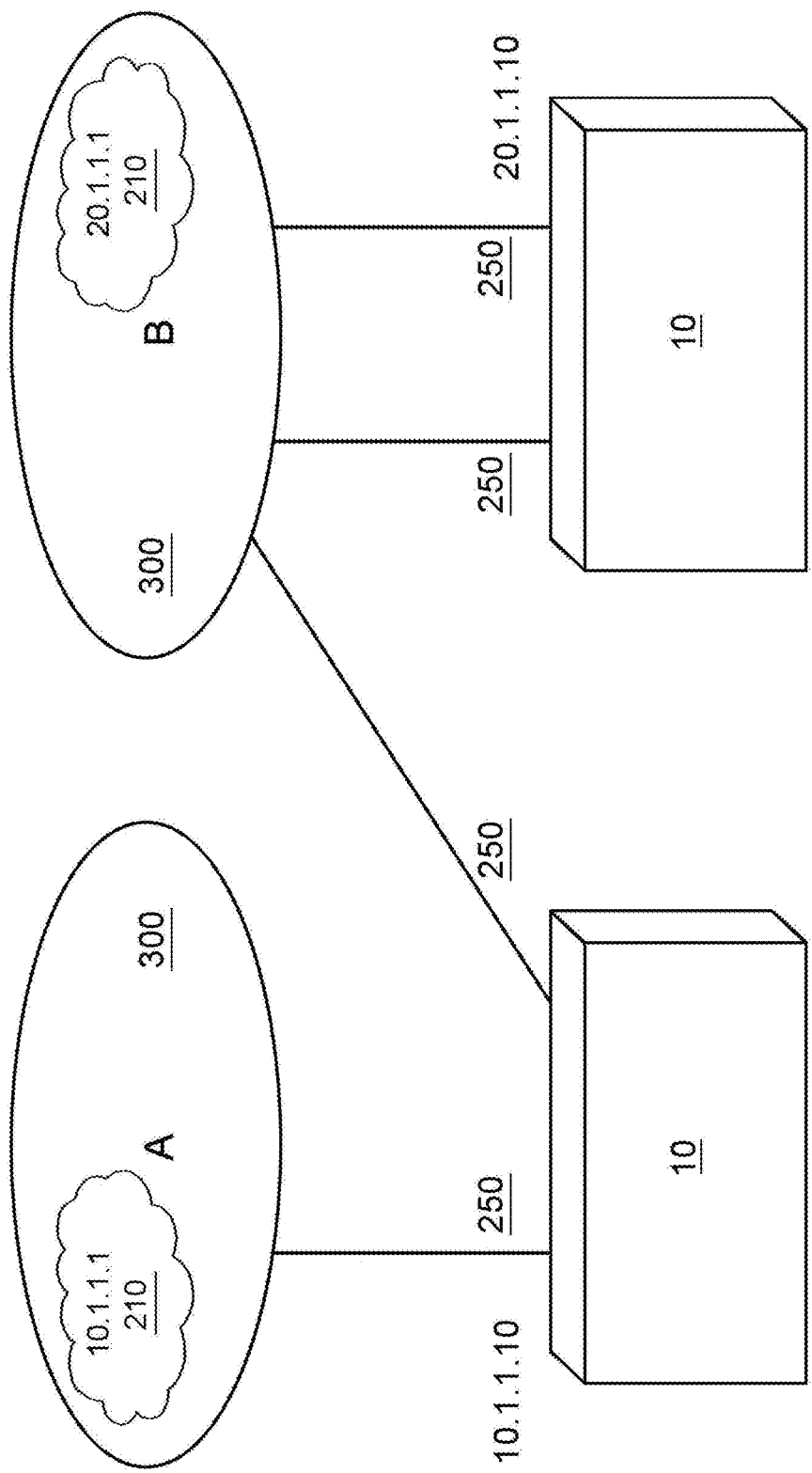
FIG. 4 depicts, in accordance with various embodiments of the present disclosure, a diagram of an example of various ports of storage filers and their connectivity.

In FIG. 4, the storage cluster of filers 10 has four ports 250. Three of the ports 250 can layer-2 ping each other and form reachability set 300 B. One of the ports 250 cannot layer-2 ping any of the other ports 250 and therefore it defines reachability set 300 A, which does not have internal reachability. However, the single port 250 in set 300 A does have an active IP address (10.1.1.10) that is connected to a gateway 210 with IP address (10.1.1.1) and therefore is connected to clients 60.

Accordingly, if set 300 A were marked as unhealthy because it does not have internal reachability, it would induce a client 60 outage because it is hosting active data packets to client(s) 60 connected to the gateway 210. Accordingly, disclosed herein are systems and methods for monitoring the health of ports 250 that also determine the external reachability of sets 300.

In set 300 B of FIG. 4, one of the ports 250 also is hosting an IP address (20.1.1.10) that is connected to clients 60 through a gateway 210. Accordingly, the ports 250 in set 300 B all have internal reachability, but also have external reachability through the port 250 that it hosting IP address 20.1.1.10. Accordingly, in this case set B is properly marked healthy. In a failover event to each of these, they would each able to continue to host an IP address.

Figure 5:
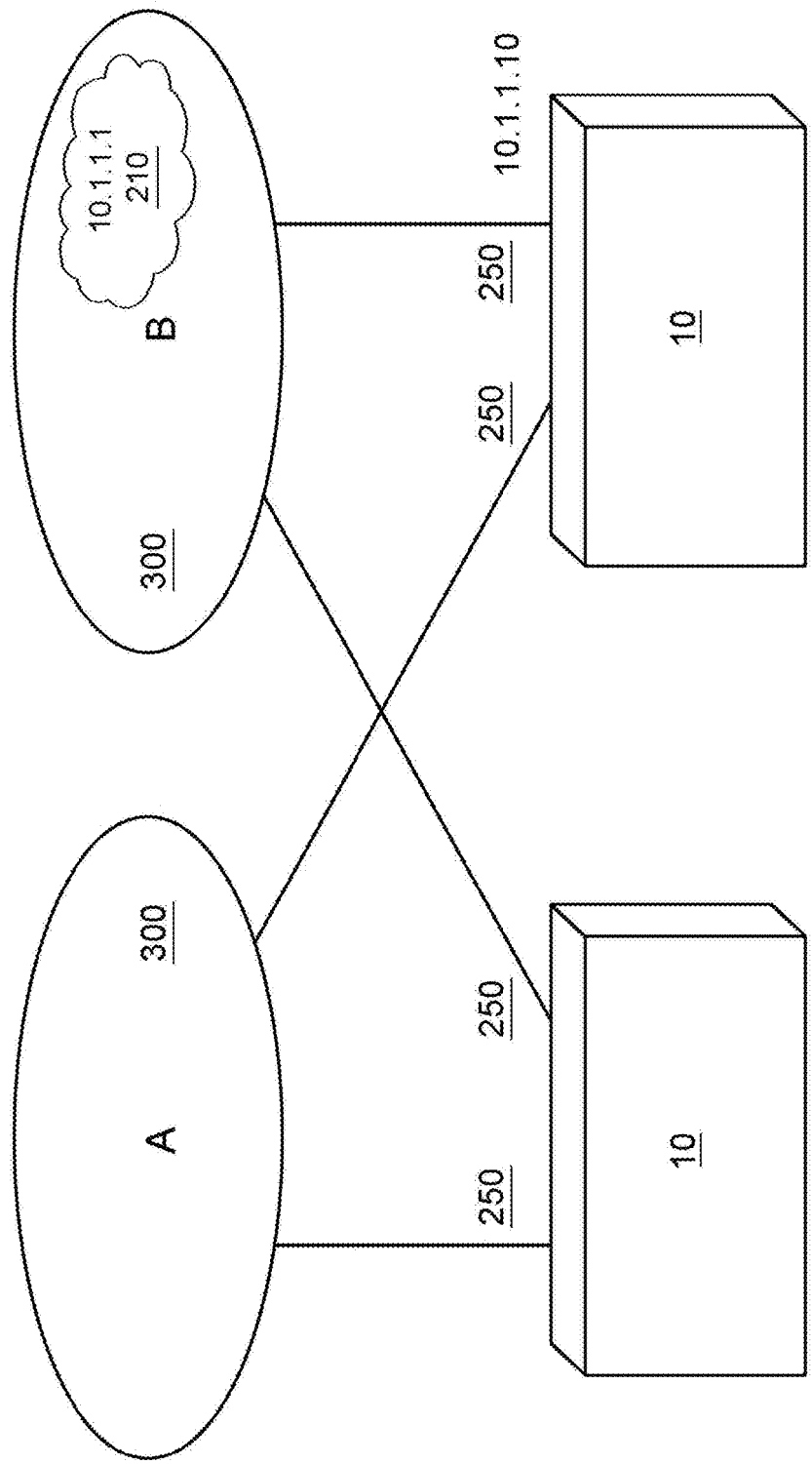
FIG. 5 depicts, in accordance with various embodiments of the present disclosure, a diagram of an example of various ports of storage filers and their connectivity.

In FIG. 5, the ports of set 300 A have internal reachability, however none of the ports of set 300 A have a connection to a gateway 210 or are hosting active traffic. Rather, the ports 250 of set 300 A are only internally reachable. Accordingly, if a health monitoring application 290 marked set 300 A as healthy because it had internal reachability, and if set 300 B were to failover to set 300 A, then the IP address 10.1.1.10 would be black holed, because set 300 A does not have external reachability. Accordingly, if a client 60 were to request storage packets by routing to the IP address associated with the ports 250 in set B, that IP address would no longer be externally reachable if the IP address failed over to set 300 A, because it does not have external reachability.

System Setup

Each broadcast domain, LAN, or other layer 2 network may have a reachability health monitoring application running on one or more filers 10. For instance, in FIG. 2, the reachability health monitor may reside in a user space application 290, and transmit data over its network ports 250. In some examples, the application may run in a distributed fashion on each filer 10 of the mass storage cluster. The application 290 may send data via a network stack 270 in the kernel 280. The server of the filer 10 may use an Ethernet driver 260 or other suitable driver to transmit data using the ports 250 across the network to other ports 250 and gateways 210.

Accordingly, in some examples, the application 290 may use the network stack 270 to send a ping or other data exchange request from the port 250 over the network 200 to other ports 250. Whether or not responses are received by the filer 10 will indicate whether the originating port 250 has layer-2 reachability to the target ports 250. Accordingly, once the application 290 identifies reachability sets 300—which ports can ping each other within the layer-2 broadcast domain—the sets 300 can be marked as healthy or degraded.

In some examples, a layer-2 ping may be the IEEE 802.1 ag CFM LBM/LBR or similar protocol. In a layer-2 ping, the Ethernet protocol may send a broadcast request (e.g. a unicast CFM LBM packet) for the specified address owned by the destination NIC (physical port 250). If the network port 250 is on the same Ethernet (Layer-2) network 200, and it is reachable, it will receive the request and respond back to the sending port 250 indicating that the port 250 with the specified MAC address is reachable.

A layer-3 ping may be an Internet protocol ping, for example as described by RFC 792. In a layer-3 ping, the device will send a ping request to an IP address (not a MAC address as in a layer-2 ping) owned by a destination port 250. Accordingly, a unicast packet with the destination IP address will be sent to the router to resolve the IP address and forward the packet to the destination IP address hosted by the target port 250. If the destination port 250, client 60 or other device, hosting the destination IP address receives the request, it will respond back to the sending port 250. Accordingly, if the response is received, the system will determine that the sending port 250 (and receiving port 250) has external reachability.

Application for Determining Whether Ports Healthy or Degraded

Figure 6:
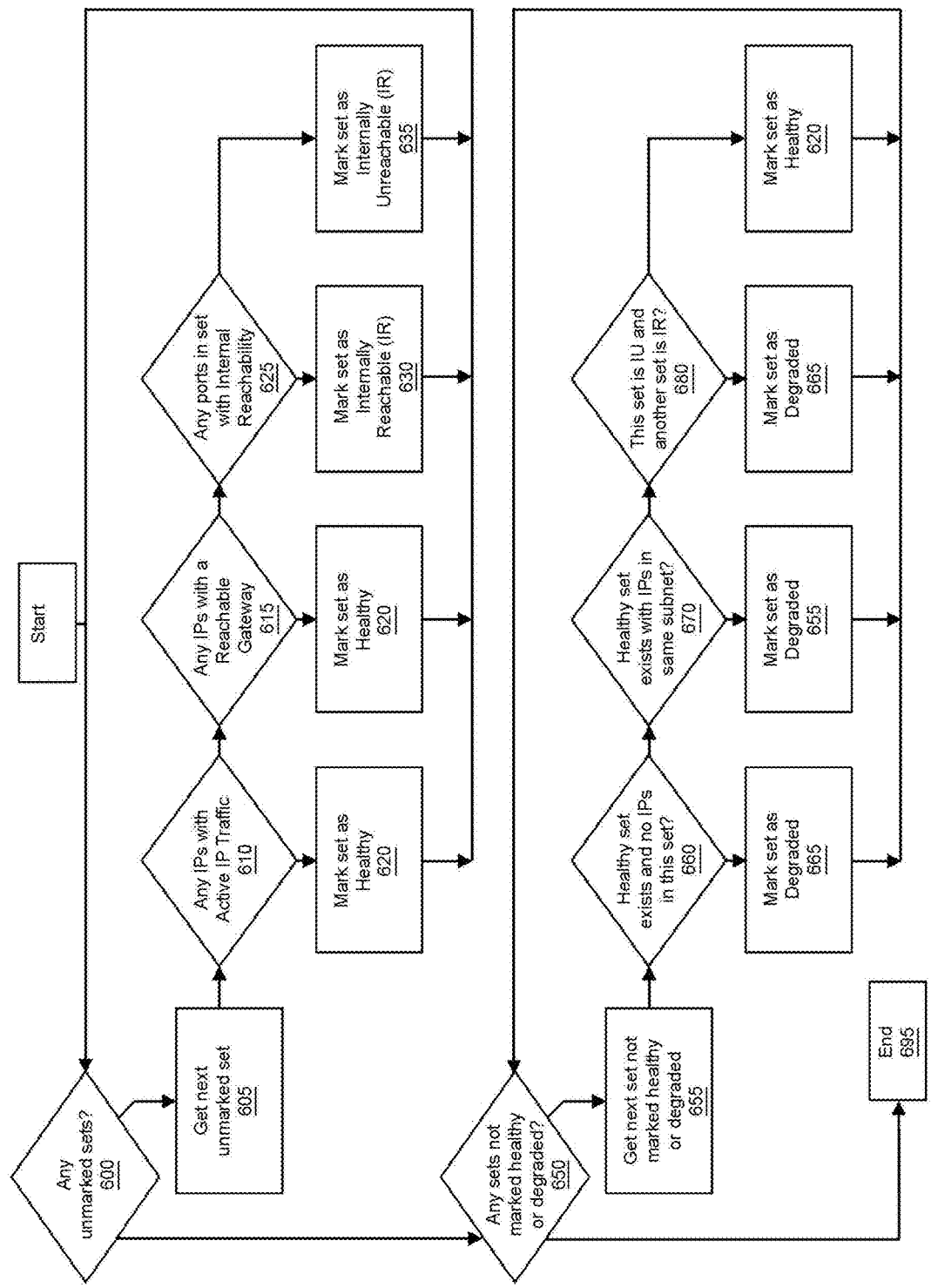
FIG. 6 depicts, in accordance with various embodiments of the present disclosure, a flow chart illustrating an example process for monitoring the health of device ports of a storage system.

FIG. 6 illustrates an example of different processes and data flows that may be used by the application 290 and system to implement the disclosed reachability monitor. For instance, first an application 290 may determine reachability sets 300 of ports 250 in a cluster of filers forming a distributed storage system. Accordingly, one or more filers 10 may send layer-2 ping or other packets from certain of the ports 250 to determine which ports 250 can exchange data on the layer-2 broadcast domain of the storage system. These will form reachability sets 300 of ports 250.

Next, the reachability sets 300 may be evaluated to determine whether they are healthy or degraded. Accordingly, once that is determined, corrective action can be taken that is necessary. Additionally, reachability sets 300 may be periodically evaluated and updated, and the reachability of the sets 300 may be periodically checked.

Accordingly, to evaluate the reachability sets 300, the two loops illustrated in FIG. 6 may be implemented. Accordingly, in some examples, the application 290 may determine whether there are any sets 300 that are unchecked or need to be rechecked 600. If yes, the first loop of the application 290 process will be implemented that checks unmarked sets 300.

First, the application 290 may retrieve the first (or next) unmarked set 300. Then, it will evaluate the ports 250 in that set 300 to determine whether there are any IPs with active IP (layer-3) traffic 610. If yes, that set will be marked as healthy 620, because marking it as degraded would result in a client 60 outage since it has active IP traffic.

If the answer is no, the application 290 may determine if any of the ports 250 in the set 300 is hosting an IP with a reachable gateway 615. If yes, then the set is externally reachable and the set would also be marked as healthy 620. If no (the application 290 cannot discover any ports 250 that can ping a gateway 615) then it would determine whether the set had any ports 250 that are internally reachable 625. If yes the set 300 would be marked as internally reachable 630, if no the set would be marked as internally unreachable 635.

After the first loop is completed on all of the sets 300, another loop can be performed. The application 290 then reviews the sets 300 to determine if any are not marked healthy or degraded 650. If no, the application 290 monitoring process is complete 695. However, the application 290 will likely run the process periodically, or in response to certain events to continually monitor the health of the port 250 sets 300.

If some sets 300 are not marked as healthy or degraded, the next set 300 would be retrieved 655. In that set 300, the application 290 would determine whether a healthy set 300 exists and there are no IPs hosted on this set 660? If yes, the set 300 would be marked as degraded 665 because an available healthy set 300 exists as previously determined in the loop.

If no, the application 290 would determine whether a healthy set 300 exists with IPs in the same subnet 670. In that case, there would likely be IPs hosted on the target set 300, but if there is a healthy set 300 in the same subnet that one would be preferred. Accordingly, If yes, the set 300 would be marked as degraded 665.

If no, the application 290 would check if the set is internally unreachable 630 (as previously determined) and another set 300 is internally reachable 680. If yes, the set 300 would be marked as degraded 665, but if no, the set 300 would be marked as healthy 620.

Accordingly, the remaining sets 300 would be cycled through the second loop 655, and their health determined. As illustrated by the second loop, the health of sets 300 may be determined based on the relative health of other sets 300 available for the storage system. The set 300 will likely be marked degraded if it is not marked healthy in the first loop, unless there are no better alternative sets 300 as determined by the second loop.

However, the application 290 may be implemented in a variety of ways, using different logic based on the needs of the particular storage system. In some examples, if a set 300 is externally unreachable it may automatically be marked unhealthy.

Storage System Selection of Ports for IP Addresses

In some examples, when a filer 10 or other storage system selects a port 250 when serving an IP address (e.g., IP address accessible to a client 60 hosted on the port 250), the filer 10 may determine whether any other IP addresses in the subnet of the port 250 IP address are already hosted on another port 250 of that filer 10 or storage system. If so, and that port 250 is part of a reachability set 300 that has external reachability for that broadcast domain or subnet, the failover targets 250 on that filer in that set 300 can be considered healthy for that IP address. Additionally, other failover targets on that storage device in other reachability sets 300 can be considered degraded. This way, each IP address will be assigned to network devices 250 with external reachability for its subnet or broadcast domain. Accordingly, individual IP addresses can prefer ports 250 with external reachability relative to their subnet if available.

CONCLUSIONS

It will be understood to those skilled in the art that the techniques described herein may apply to any type of special-purpose computer (e.g., file serving appliance) or general-purpose computer, including a standalone computer, embodied as a storage system. To that end, the filer can be broadly, and alternatively, referred to as a storage system.

The teachings of this disclosure can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the techniques described herein.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present disclosure, but merely be understood to illustrate one example implementation thereof.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The various methods and techniques described above provide a number of ways to carry out the disclosure. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Certain embodiments of this application are described herein. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

The invention claimed is:

1. A method, comprising:

transmitting a first message by a first device port of a set of device ports of a first node and a second node of a storage system to other device ports of the set of device ports, using a first protocol; wherein a response to the first message from the other device ports indicates that the set of device ports are internally reachable within a broadcast domain of the storage system;

determining that the set of device ports are externally reachable, when the first node detects that a second device port is hosting a network address that enables active network traffic with a client system via a network device external to the broadcast domain, or when the second device port is able to communicate with a gateway via a second protocol, wherein the gateway is connected to the broadcast domain and enables network communication between the second device port and the client system; and updating a data structure by the first node indicating whether the set of device ports are internally reachable based on the response and externally reachable when the second device port is detected hosting the network address or when the first node determines that the second device port is able to communicate with the gateway using the second protocol;

wherein when none of the device ports of the set are externally reachable, then the first node uses the data structure to indicate that the set of device ports are only internally reachable within the broadcast domain to avoid using the set of device ports for a failover operation for taking over network communication from another set of device ports that require external reachability;

wherein the first node uses the data structure for network address assignment for the set of device ports.

2. The method of claim 1, wherein the first message is based on a layer-2 ping from the first device port to the other device ports.

3. The method of claim 1, wherein the second device port uses a layer-3 ping to communicate with the gateway and the gateway responds to the layer-3 ping based on a target Internet Protocol address.

4. The method of claim 1, wherein the first response from the other device ports includes a media access control (MAC) address.

5. The method of claim 1, wherein the network address hosted by the second device port is an Internet Protocol address.

6. The method of claim 1, wherein the first and second device ports are Ethernet adapters and the network device is a router.

7. A non-transitory machine readable medium having stored thereon instructions for performing a method of monitoring connectivity of device ports comprising machine executable code which when executed by at least one machine, causes the machine to:

transmit a first message by a first device port of a set of device ports of a first node and a second node of a storage system to other device ports of the set of device ports, using a first protocol; wherein a response to the first message from the other device ports indicates that the set of device ports are internally reachable within a broadcast domain of the storage system;

determine that the set of device ports are externally reachable, when the first node detects that a second device port is hosting a network address that enables active network traffic with a client system via a network device external to the broadcast domain, or when the second device port is able to communicate with a gateway via a second protocol, wherein the gateway is connected to the broadcast domain and enables network communication between the second device port and the client system; and update a data structure by the first node indicating whether the set of device ports are internally reachable based on the response and externally reachable when the second device port is detected hosting the network address or when the first node determines that the second device port is able to communicate with the gateway using the second protocol;

wherein when none of the device ports of the set are externally reachable, then the first node uses the data structure to indicate that the set of device ports are only internally reachable within the broadcast domain to avoid using the set of device ports for a failover operation for taking over network communication from another set of device ports that require external reachability;

wherein the first node uses the data structure for network address assignment for the set of device ports.

8. The storage medium of claim 7, wherein the first message is based on a layer-2 ping from the first device port to the other device ports.

9. The storage medium of claim 7, wherein the second device port uses a layer-3 ping to communicate with the gateway and the gateway responds to the layer-3 ping based on a target Internet Protocol address.

10. The storage medium of claim 7, wherein the first response from the other device ports includes a media access control (MAC) address.

11. The storage medium of claim 7, wherein the network address hosted by the second device port is an Internet Protocol address.

12. The storage medium of claim 7, wherein the first and second device ports are Ethernet adapters and the network device is a router.

13. A system, comprising:

a memory containing machine readable medium comprising machine executable code having stored thereon instructions; and a processor coupled to the memory, the processor configured to execute the machine executable code to cause the processor to:

transmit a first message by a first device port of a set of device ports of a first node and a second node of a storage system to other device ports of the set of device ports, using a first protocol; wherein a response to the first message from the other device ports indicates that the set of device ports are internally reachable within a broadcast domain of the storage system;

determine that the set of device ports are externally reachable, when the first node detects that a second device port is hosting a network address that enables active network traffic with a client system via a network device external to the broadcast domain, or when the second device port is able to communicate with a gateway via a second protocol, wherein the gateway is connected to the broadcast domain and enables network communication between the second device port and the client system; and update a data structure by the first node indicating whether the set of device ports are internally reachable based on the response and externally reachable when the second device port is detected hosting the network address or when the first node determines that the second device port is able to communicate with the gateway using the second protocol;

wherein when none of the device ports of the set are externally reachable, then the first node uses the data structure to indicate that the set of device ports are only internally reachable within the broadcast domain to avoid using the set of device ports for a failover operation for taking over network communication from another set of device ports that require external reachability;

wherein the first node uses the data structure for network address assignment for the set of device ports.

14. The storage medium of claim 13, wherein the first message is based on a layer-2 ping from the first device port to the other device ports.

15. The storage medium of claim 13, wherein the second device ports uses a layer-3 ping to communicate with the gateway and the gateway responds to the layer-3 ping based on a target Internet Protocol address.

16. The storage medium of claim 13, wherein the first response from the other device ports includes a media access control (MAC) address.

17. The storage medium of claim 13, wherein the network address hosted by the second device port is an Internet Protocol address.

* * * * *